United States Patent [19]

Vonder

[11] 4,255,634
[45] Mar. 10, 1981

[54] CAM ACTUATED SWITCHING DEVICE

[75] Inventor: David L. Vonder, Addison, Ill.

[73] Assignee: GYE Automatic Electric Laboratories Incorporated, Northlake, Ill.

[21] Appl. No.: 80,818

[22] Filed: Oct. 1, 1979

[51] Int. Cl.³ .............................................. H01H 3/42
[52] U.S. Cl. ............................ 200/153 LA; 200/1 A;
200/6 BB
[58] Field of Search ............ 200/1 A, 6 BB, 153 LA, 200/329; 179/164

[56] References Cited

U.S. PATENT DOCUMENTS

| | | | |
|---|---|---|---|
| 2,897,317 | 7/1959 | Hufnagel | 200/1 A |
| 2,902,549 | 9/1959 | Bernstein | 200/1 A |
| 3,355,558 | 11/1967 | Greese et al. | 200/153 LA |
| 4,046,980 | 9/1977 | Rosebrock | 200/153 LA |

FOREIGN PATENT DOCUMENTS 550172 4/1932 Fed. Rep. of Germany ... 200/153 LA
1109762 6/1961 Fed. Rep. of Germany ... 200/153 LA Primary Examiner—Willis Little
Attorney, Agent, or Firm—Robert J. Black; Anthony Miologos

[57] ABSTRACT

A switching device comprising a spring pile-up assembly including a plurality of pairs of cantilevered stationary and movable contact springs secured between a pair of support members. A follower card is slidably mounted on the top portions of the support member allowing the follower to move in a plane 90 degrees to the contact springs. The tips of the movable contact springs protrude through openings in the follower card. A cam card including cam portions is slidably mounted to one of the support members perpendicular to the follower. As the cam card is moved the cams engage an edge of the follower causing it to be displaced in its plane of motion sufficiently to open a selected number of contact springs while allowing another selected number of contact springs to close.

13 Claims, 5 Drawing Figures

CAM ACTUATED SWITCHING DEVICE

BACKGROUND OF THE INVENTION

1. Field of the Invention

This invention relates in general to electrical switches and more particularly to cam actuated switching devices.

2. Description of the Prior Art

Essentially all telephone instruments include a switch that is actuated by the removal of the telephone handset from and replacement of the handset on the telephone base. Basically, the actuation of the switch serves to connect the telephone to an associated telephone line responsive to the removal and to disconnect responsive to the replacement of the handset. This switch is therefor often referred to as the line switch or hookswitch. Nearly all hookswitches, however, perform functions in addition to the basic one. Consequently, they generally include between four and six contact pairs that are operated in a particular sequence.

With the advent of modern electronic key telephone systems a host of new features and services are being offered the telephone subscriber that were never economically possible before. To help perform these new functions it is desirable to have a compact hookswitch with a large number of spring combinations. The conventional method of hookswitch operation has been one of "pressure-make" contact actuation. That is, the operation of the hookswitch plunger deflects spring members and causes their contact to be forced together thereby making an electrical contact. In the case of break contact pairs their springs are forced apart thereby opening the electrical connection. With the "pressure-make" type of contact actuation the force required to operate the hookswitch increases dramatically as the number of spring combinations increase.

The force necessary to operate the hookswitch plunger and thus the hookswitch itself is derived from the weight of the telephone handset and over the years not only has the weight of the handset been reduced but telephone base designs have been reduced where only a portion of the handset weight is applied to the hookswitch. Thus hookswitches have had to be designed that operate in response to smaller and smaller forces.

The large force buildup in the hookswitch springs limits the number of spring combinations that can possibly be operated by the weight of the telephone handset and can also result in contact bounce during hookswitch restoral.

One such hookswitch is described in U.S. Pat. No. 4,046,980 to F. A. Rosebrock issued Sep. 6, 1977. The switch as taught by Rosebrock is limited by the fact that it teaches only up to six make or break contact pairs or three transfer "sequence or continuity" contacts as possible with this design. Increasing the amount of contacts actuated by the cam would thus increase the force needed to operate the contacts and defeat its intended purpose.

Therefore, it is an object of the present invention to provide a simple, effective, cam actuated switching device able to switch a large number of contacts with a relatively small force.

SUMMARY OF THE INVENTION

To accomplish its object, the present invention contemplates the use of a plurality of stationary contact springs, a plurality of movable contact springs, a return spring and molded insulators assembled sandwich fashion between two metal brackets. The top portions of the metal brackets have formed tabs on which a molded follower card is allowed to move in a plane 90° to the tips of the contact springs. The tips of the movable contact springs protrude through slotted openings in the follower card. As the follower is caused to move the solid portion of the card between the slotted openings pushes against the normally closed contacts and causes them to open. The normally opened contacts are held open by the follower and as it is moved out of the way it permits these normally opened contacts to close against their stationary contacts under their own pretension forces. The movable contact springs are always biased prior to assembly and are oriented within the assembly such that the bias is toward their stationary contact springs.

The follower card further includes notched portions having a first or second depth emenating from the solid portion of the follower allowing a selected number of contact springs associated with the notches to remain closed when the adjacent contact springs are pushed open or to open at a time interval after adjacent springs are opened. Thereby providing selective and/or sequential operation of the contacts.

A molded cam card is attached to the vertical side edges of one of the metal brackets and is permitted to slide verically in a plane perpendicular to the follower card. Two cam surfaces are molded on an inner face of the cam card. As the cam card is raised vertically the two cam surfaces engage the end of the follower causing the follower to translate in its plane of motion a distance equal to the height of the cams. The motion parted to the follower is sufficient to cause operation of the contact springs. The motion of the cam card is under the control of the hookswitch plunger which is operated by the weight of the telephone handset. The advantage of this type of hookswitch operation is that the relatively large travel of the hookswitch plunger is translated into a relatively small and controlled motion of the actuating card by the shape and size of the cam surface on the cam card.

BRIEF DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

Figure 1:
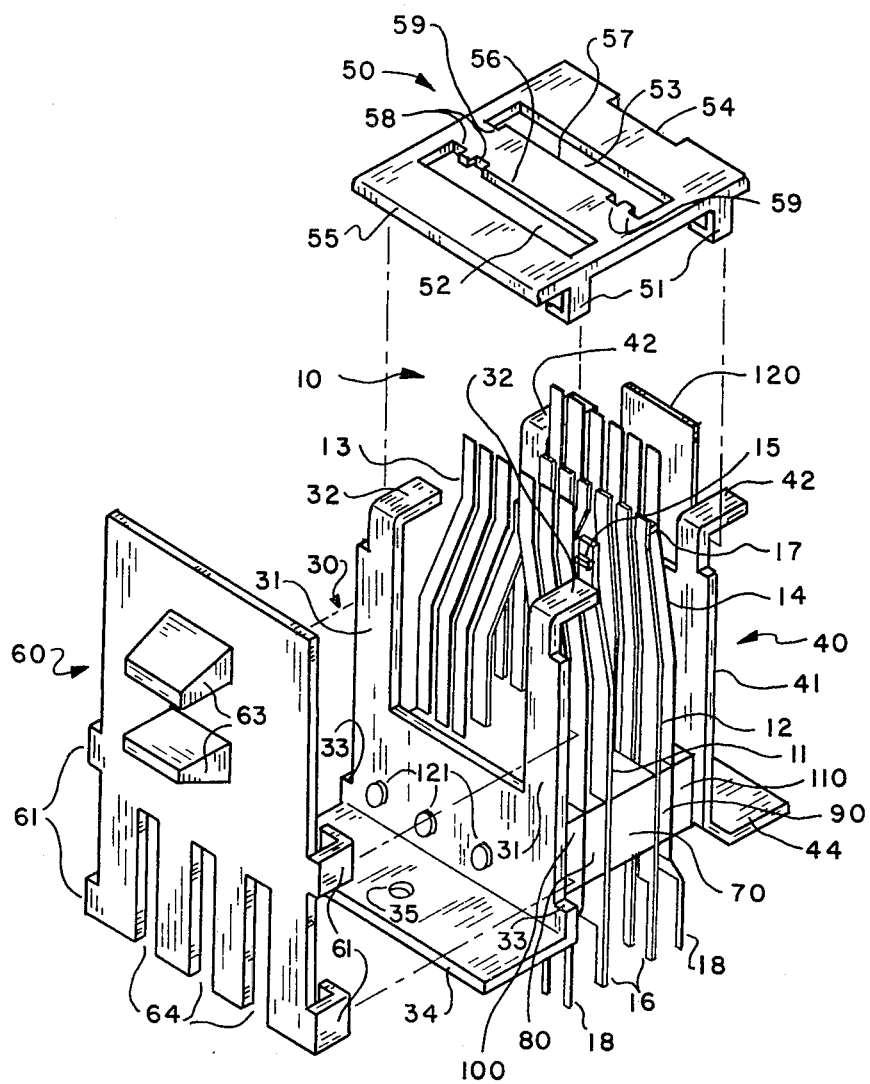
FIG. 1 is a partially exploded perspective view of the switching device emboding the present invention.
Figure 2:
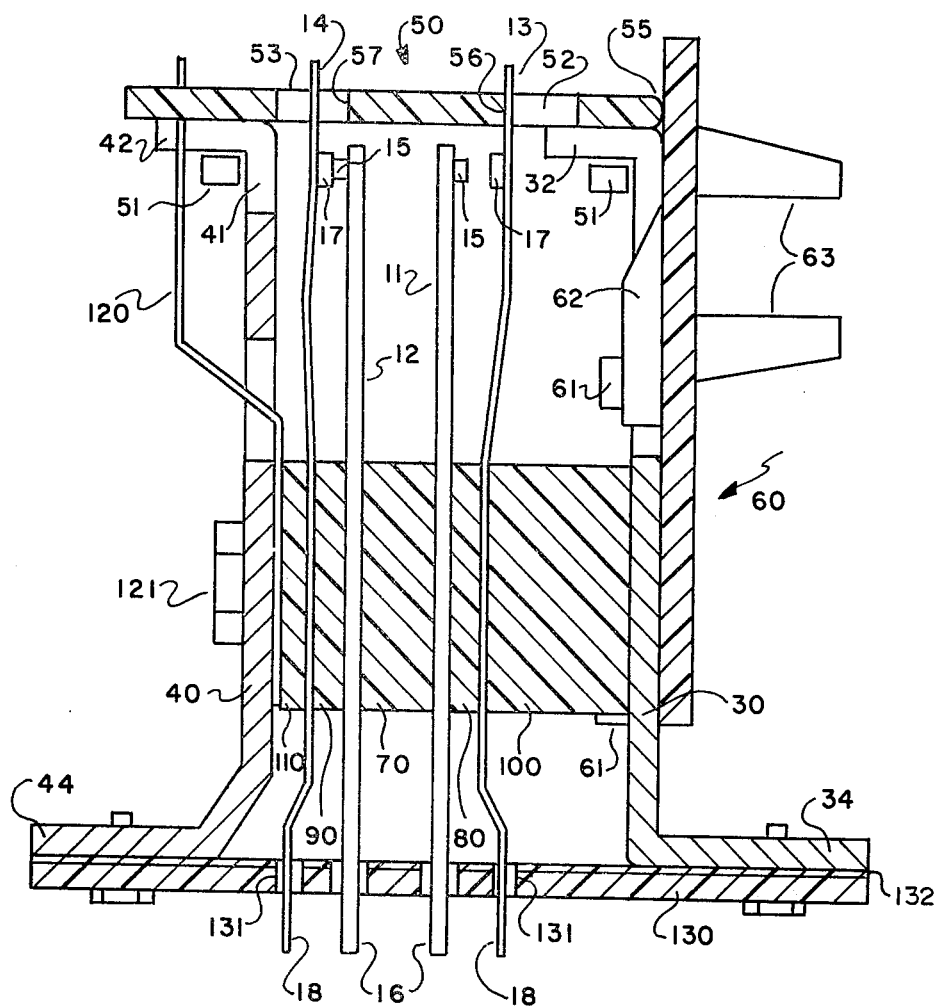
FIG. 2 is a longitudinal sectional view of the assembled switching device shown with the cam card in a non-operated position.

Referring to FIG. 1 and FIG. 2 of the drawings, the switching device in accordance with the present invention includes a contact spring pile-up assembly 10, first and second support brackets 30 and 40 respectively, a follower card 50 and a cam card 60.

Assembled between first and second support brackets 30 and 40 is the contact spring pile-up assembly 10 comprising stationary contact spring groups 11 and 12 separated by a dielectric spacer 70 and movable contact spring groups 13 and 14. Each contact spring group is comprised of a plurality of co-planar springs. As can be seen on FIG. 1, each group of stationary contact groups 11, 12 is adjacent a complementary movable contact group 13, 14 respectively. Stationary contact spring group 11 is separated from its associated movable contact spring group 13 by a dielectric spacer 80 and similarly stationary contact spring group 12 separated from movable contact spring group 14 by dielectric spacer 90.

The stationary and movable contact spring groups 11, 12 and 13, 14 are manufactured from sheet stock of a gauge such that the stationary contact springs are relatively stiff while the movable contact springs are relatively flexible.

Each stationary spring of groups 11, 12 has a raised contact surface 15 at its forward end and a terminal post 16 at its rear end. In similar fashion each movable spring of groups 13, 14 has a raised contact surface 17 at its forward end and a terminal post 18 at its rear end. Each contact surface 15 of stationary spring group 11, 12 is located so as to be in registration with an adjacent and respective contact surface 17 of movable contact groups 13, 14 respectively. The movable contact springs 13, 14 are longer than the stationary springs 11, 12 and therefore the forward ends of the movable contact springs extend for a distance beyond contact surface 17. Furthermore, the forward portion of the movable contact springs are provided with a permanent set so that the forward portions incline toward their respective stationary contact springs as can be seen best in FIG. 2. This permanent set provides a predetermined contact force once the contacts are assembled. Finally, the rear ends of the movable contact springs are provided with a bend to increase the spacing of the terminal posts 18 thereat from the terminal posts 16 of the stationary contact springs.

The stationary contact springs 11, 12, spacer 70, movable contact springs 13, 14, spacers 80, 90, 100, 110 and return spring 120 are secured between the first and second support brackets 30, 40 by fasteners 121. The heads of fasteners 121 engage the second support bracket 40 while the stems of the fasteners extend through holes in the associated components (not shown) and thread into corresponding tapped holes on the first support bracket 30. Fasteners 121 draw the mounting brackets 30 and 40 toward one another and thereby clamp the stationary and movable contact spring groups and spacers in place.

First and second support brackets 30, 40 are U-shaped in structure and include a pair of co-planar legs 31 and 41 respectively. Each leg 31 and 41 is oriented in a mutual direction with the contact spring groups and includes a horizontally oriented guide portion 32, 42 respectively, formed perpendicular at a forward end of each leg. Guides 32, 42 are adapted to be stradled by a respective L-shaped follower card mounting member 51 allowing follower 50 to be slideably mounted thereat.

As can be seen on FIG. 2 follower 50 when installed on legs 32 and 42 overlies stationary contact springs 11, 12. The forward ends of movable contact groups 13 and 14 extend through and beyond transversely oriented openings 52, 53 positioned along the mid-section of follower 50. Each movable contact group extends through a different and respective opening 52, 53. The follower 50 further includes a notched portion 54 situated on a rear edge of the follower and is disposed to accept return spring 120 therein.

The assembly is completed by a cam card 60 which includes L-shaped mounting members 61 which are arranged to stradle legs 31 of first support bracket 30. Mounting members 61 are adapted to allow cam card 60 to be slideable along legs 31, 90° to the horizontal plane of follower 50. An inner face of cam card 60 includes a pair of longitudinally oriented cam faces 62 (only one shown) adapted to engage a rounded front portion 55 of follower 50. An outer face of cam card 60 includes leg portions 63 which provide the means for displacing cam card 60. A known starting point for the displacement of the cams 62 is provided by shoulders 33 on the first support bracket 30. Shoulders 33 are disposed to allow the bottom pair of members 61 to rest thereat when cams 62 are disengaged from follower edge 55. Cam card 60 further includes longitudinal channels 64 which provides proper clearance between cam card 60 and the stems of fasteners 121 which protrude from mounting bracket 30. The asembled switching device is mounted to a printed wiring card 130 by means of mounting section 34, 44 of mounting bracket 30, 40 respectively. Mounting section 34, 44 include mounting holes 35, 45 adapted to accept threaded fasteners therein, securing the switching device and an insulator 132 to the printed wiring card 130. Openings 131 on insulator 132 and printed wiring card 130 accept each terminal 16, 18 therethrough allowing connection of each terminal to a source of electrical potential on the printed wiring card. Insulator 132 provides separation between the switching device and the electrical traces found on the printed wiring card.

Figure 4:
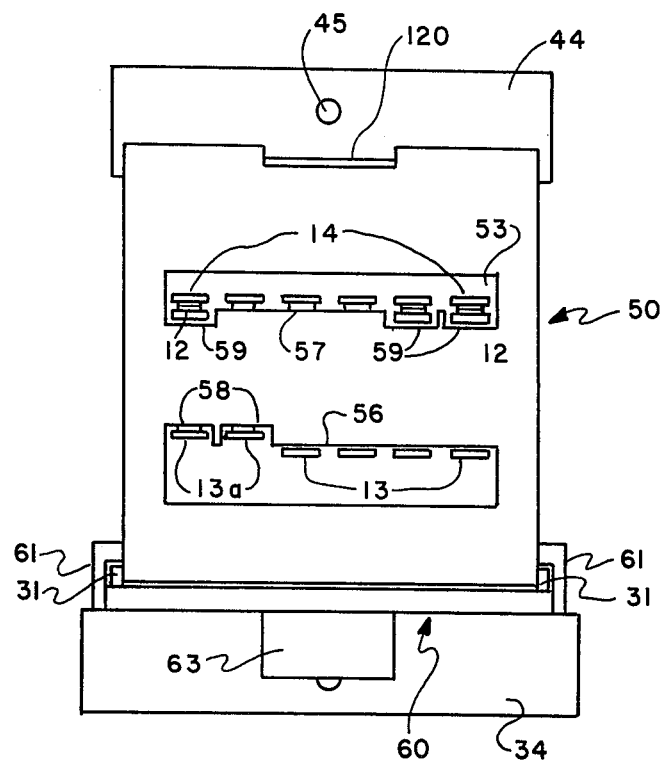
FIG. 4 is a top view of the assembled switching device showing the cam follower in the resting position.

Returning now to FIG. 2 and FIG. 4, it is seen that with cam card 60 in the non-activated position follower 50 is urged toward cam card 60 by return spring 120 which allows front edge 55 to rest against the cam cards inner face. In this position movable contact spring group 14 under its own pretension forces is drawn to stationary contact spring group 12 and each contact surface 17, of spring group 14 engages a respective one of contact surfaces 15. Cam card edge 56 engages the forward portion of a selected number of movable contact springs of group 13 urging those selected springs away from their respective stationary contact springs 11 and disengaging respective contact surfaces 17, 15. Notched portions 58 of edge 56 allow a second selected number 13a of movable contact spring group 13 to remain closed against their associated stationary spring contact 11. It should be noted that by varying the depth of notched portions 58 (not shown), a sequence of contact opening and closing may be achieved. For example, by decreasing the depth of either or both of notched portions 58 to approximately half the depth illustrated in FIG. 4 contact springs 13a would not stay closed against their respective stationary spring contacts 11 but would be urged open by notched portions 58 at an interval of time after contact springs 13 are urged open by edge 56. When allowed to close springs 13a would close before springs 13 against their respective stationary spring contacts 11. Thus, establishing a sequence of contact opening and closing relative to the travel of follower 50.

As can be seen in FIG. 2 all the contact springs associated with group 14, are closed against stationary contact group 12 under their own pretension forces. Thus with follower 50 in a resting position springs 13 are open while springs 13a and 14 are closed.

Figure 3:
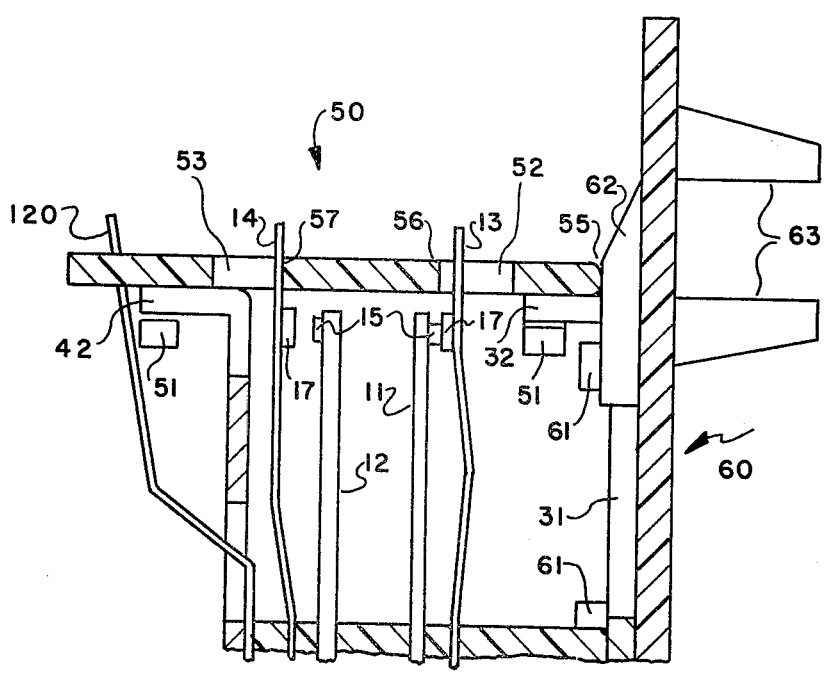
FIG. 3 is a partial longitudinal sectional view of the assembled switching device shown with the cam card in an operated position.
Figure 5:
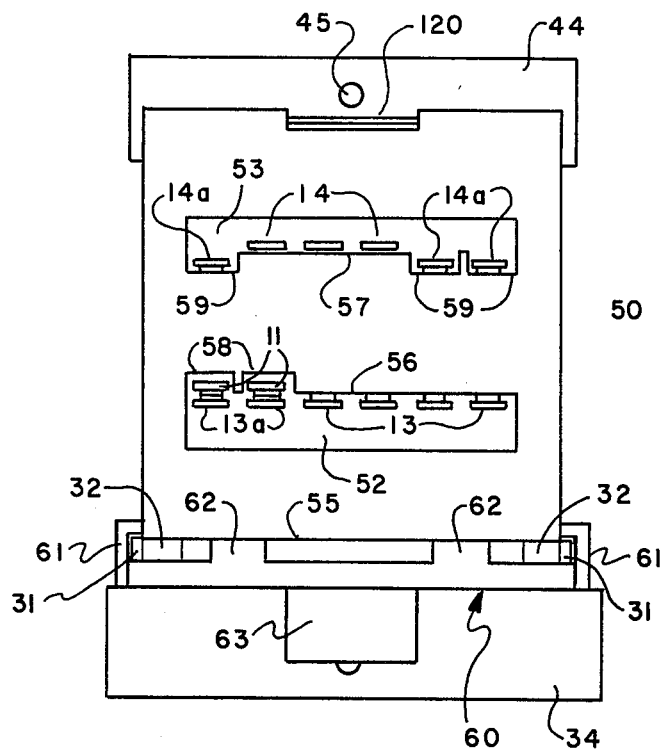
FIG. 5 is a top view of the assembled switching device showing the cam follower in an operated position.

Turning now to FIG. 3 and FIG. 5, a mechanical force when applied to leg portions 63 slide cam card 60 upward along legs 31 and cams 62 into contact with follower edge 55. Follower 50 is then displaced rearwardly a distance equal to the height of the cams disengaging edge 56 from movable contact springs group 13 and allowing those selected contact springs under their pretension forces to engage stationary contact spring group 11, closing their associated contacts 17, 15. Simultaneously as follower 50 is urged rearward edge 57 engages the forward end of a selected number of contact springs in group 14 urging them away from their respective stationary contact springs 12 and disengaging respective contacts 17, 15.

As can be seen on FIG. 5 notched portion 59 of edge 56 allow a second selected number 14a of movable contact spring group 14 to remain closed against their associated stationary spring contact 12. A sequential opening of spring group 14 and 14a may be achieved by decreasing the depth of notched portions 59 in the same manner as described previously for spring groups 13, 13a.

It can be appreciated that by altering the position, depth and number of the notches on edge 56 and 57 any number of opening and closing of contacts or sequence of contact operation may be programmed into the follower card 50. Since the follower 50 is a relatively inexpensive component to mold, the selection of contact operation can be altered by merely replacing one follower card for another of the appropriate configuration.

Return spring 120 is also displaced rearward when follower 50 is operated storing spring energy which is released when cams 62 are disengaged from the follower 50, edge 55, returning the follower to its resting position. The displacement of the cam card is mechanically linked and under control of the hookswitch plunger associated with the telephone instrument which is operated in turn by the weight of the telephone handset.

The present invention has been described with reference to a specific embodiment thereof, for the purpose of illustrating the manner in which the invention may be used to advantage, and it will be appreciated by those skilled in the art that the invention is not limited thereto. Accordingly, any and all modifications, variations or equivalent arrangements which may occur to those skilled in the art should be considered to be within the scope of the invention.

What is claimed is:

1. A switching device comprising:
a first plurality of pairs of contact springs, each contact spring of each of said pairs of contact springs including a fixed and electrically insulated from one another and a free end, each of said free ends in spaced relationship with one another and each including a contact surface on a portion of said free ends and said contact surfaces engaging one another, a second plurality of pairs of contact springs each pair of second plurality of pairs of contact springs directly opposite and in a spaced registration with a respective pair of said first plurality of contact springs, each contact spring of each of said second pairs of contact springs including a fixed end electrically insulated from one another and a free end, each of said free ends in spaced relationship with one another and each including a contact surface on a portion of said free end, and said contact surfaces engaging one another;
a first support bracket having said plurality of first and second pairs of contact springs secured thereat, said first support bracket electrically insulated and in spaced relationship with said first plurality of pairs of contact spings, said first support bracket including a pair of legs in spacial and co-planar relationship with one another in a mutual orientation with said plurality of first and second pairs of contact springs, each of said legs including a guide portion oriented perpendicular to said legs;
a follower slideably mounted and displaceable along said guide portions and including electrically insulated first and second edges, said edges transversely oriented between said plurality of first and second pairs of contact springs, said first edge including at least one notched portion of a first depth and said notch arranged in registration with a selected one of said pairs of contact springs, said first edge in contact with a first contact spring of said first plurality of pairs of contact springs urging said contact surfaces disengaged and said selected pair of contact springs in registration with said notch having said contact surfaces closed, said second edge adjacent a first contact spring of said second plurality of contact springs;
an actuator slideably mounted and displaceable along said first support bracket legs perpendicular to said follower and including a cam portion for engaging said follower so as to displace said follower to enforce contact of said follower second edge with said plurality of first contact springs of said second plurality of pairs of contact springs allowing said contact surfaces to disengage and simultaneously displacing said follower first edge out of contact with said first contact springs of said first plurality of pairs of contact springs allowing engagement of said contact surfaces.

2. A switching device as claimed in claim 1, wherein: said follower second edge includes at least one notched portion of a first depth in registration with a selected pair of said second contact springs allowing said selected contact springs contact surfaces to remain closed when said second edge engages said plurality of first contact springs of said second plurality of pairs of contact springs urging said contact surfaces to disengage.

3. A switching device as claimed in claim 2, wherein: said follower first and second edges include a plurality of notches of a first depth and each of said first edge notches are in registration with one of a selected pair of said first plurality of pairs of contact springs and each of said second edge notches are in registration with one of a selected pair of said second plurality of pairs of contact springs.

4. A switching device as claimed in claim 1, wherein: said follower first edge includes at least one notched portion of a second depth, and said second depth is less than said first depth, said notch in registration with a selected pair of said first contact springs urging said selected contact springs contact surfaces disengaged at a time interval after said first edge engages said plurality of first contact springs of said first plurality of pairs of contact springs urging said contact surfaces disengaged.

5. A switching device as claimed in claim 4, wherein: said follower second edge includes at least one notched portion of said second depth in registration with a selected pair of said second contact springs urging said selected contact springs contact surfaces disengaged at a time interval after said second edge engages said plurality of first contact springs of said second plurality of pairs of contact springs urging said contact surfaces disengaged.

6. A switching device as claimed in claim 5, wherein: said follower first and second edges include a plurality of notches of a second depth and each of said first edge notches are in registration with one of a selected pair of said first plurality of pairs of contact springs and each of said second edge notches are in registration with one of a selected pair of said second plurality of pairs of contact springs.

7. A switching device as claimed in claim 1, wherein: there is included a second support bracket opposite said first support bracket having said first and second pairs of contact springs secured thereat, said second support bracket electrically insulated and in spaced relationship with said second pair of contact springs and including a pair of legs in spacial and co-planar relationship with one another and in a mutual orientation with said first and second pairs of contact springs each of said legs including a guide portion oriented perpendicular to said legs and having said follower slideably mounted on said guide portions.

8. A switching device as claimed in claim 7, wherein: said follower includes a third edge opposite said first edge and a fourth edge opposite said second edge and said second support bracket includes a flat spring having an end secured to said second support bracket and an opposite end in contact with and applying a mechanical force against said follower fourth edge, said follower first edge in contact with said first contact spring of said first pair of contact springs urging said contact surfaces disengaged in response to said mechanical force and said third edge in juxtaposition with said actuator and displaceable by said cam.

9. A switching device as claimed in claim 1, wherein: said first contact spring of each of said first and second pairs of contact springs overlies and is biased towards a second contact spring and each of said first contact springs extends beyond the free end of each of said second contact springs, said follower overlying each of said second contact springs and said first and second edges transversely oriented between said first contact springs.

10. A switching device as claimed in claim 7, wherein: said follower includes L-shaped members adapted to straddle said first and second support bracket guide portions slideably mounting said follwer to said guide portions and displaceable along said guide portions.

11. A switching device as claimed in claim 1, wherein: said actuator includes L-shaped members adapted to straddle said first support bracket legs slideably mounting said actuator to said legs and said actuator displaceable along said legs.

12. A switching device as claimed in claim 7, wherein: said first support bracket and said second support bracket includes a mounting base perpendicular to said first support bracket and said second support bracket legs directly opposite said guide portions and arranged to mount said switching device to a printed wiring card.

13. A switching device as claimed in claim 1, wherein: the actuator includes integral means extending from the side opposite of said cam for displacing said actuator.

* * * * *